United States Patent Office 3,676,128
Patented July 11, 1972

3,676,128
COMPLEX FILM FOR OBTAINING SILK SCREEN STENCILS
Henri Leopold and Jacques Pomathios, Poncin, France, assignors to Etablissements Tiflex, Poncin, France
Filed June 8, 1967, Ser. No. 644,683
Claims priority, application France, June 20, 1966, 47,439
Int. Cl. G03c 5/00
U.S. Cl. 96—36.4
5 Claims

ABSTRACT OF THE DISCLOSURE

A complex film for producing silk screen stencils includes three layers superposed and joined relative to one another. A backing layer, an emulsion layer, and a transparent layer interposed therebetween constitute the three layers. The backing layer is joined to the transparent layer only temporarily and is easily removed or peeled therefrom.

---

The present invention relates to a complex film for obtaining stencils used in the silk screen field.

There are three ideal requirements for such stencils to wit, extreme sharpness when reproducing, prolonged adhesion of the fixed portions to the gauze, so as to obtain a great number of copies, and an efficient, simple, and fast operation for the operator.

Quite a number of methods are known for obtaining such stencils, but none meets all the above-mentioned requirements. As a matter of fact, meeting the first requirement requires a glazing operation, while a direct daylight exposure is necessary for the second requirement. Some of the known methods make it possible to meet the first two requirements, such as, for instance, the glazing method described in the French Pat. No. 1,237,498 of Oct. 12, 1959. However, heretofore no method meets the third requirement.

The object of the present invention is to harmonize said three requirements by making available to the operator a complex film adapted to be very quickly fixed to the gauze and treated subsequently, without requiring any special precautions.

To this end, the complex film of the invention comprises three superposed layers, to wit, a supporting film and a photo-sensitive or photo-sensitizable layer, and, interposed therebetween, a transparent film adapted to mechanically protect the photo-sensitive or photo-sensitizable layer during the subsequent washing and drying operations, said transparent film being very thin. The photo-sensitive or photo-sensitizable layer must adhere prefectly to said transparent film, while the latter, which is in contact with the supporting film, must be capable of parting readily from said supporting film.

The transparent film used must have the same refractive index as that of the photo-sensitive or photo-sensitizable layer ($\pm 0.05$ n.), so as to prevent any change in the incidence of the light rays, and thus any distortion of the pattern, during the daylight exposure.

Because of the presence of said transparent film in the complex of the invention, in association with the supporting film, an absolutely plane surface is obtained, which is a critical requirement for producing accurate reproductions.

The complex film of the invention is adapted to be supplied to the operator in rolls, or alternatively, it is pre-cut to size.

By way of example, the respective thicknesses of the three layers forming said complex may be as follows:

Supporting film: from 20 to 50$\mu$ (microns)
Transparent film: from 2 to 10$\mu$
Photo-sensitive layer: from 10 to 50$\mu$ As regards the nature of said three layers, examples are given hereinbelow:

Supporting film: Ethyl terephthalate, such as the trademarks "Nylar," "Terphane," "Hostaphan"; cellulose film, acryl film, vinyl film, polyamide film, polystyrene film; metal foil; coated paper; and the like.

Transparent film: Cellulose, vinyl, acryl base.

Photo-sensitive layer: gelatin, poly(vinyl) alcohol or other polymer, and photo-sensitive colloid.

Said complex film is used as follows:

The complex film of the invention is applied onto the back of a conventional screen, over which a gauze is stretched, with the photo-sensitive or photo-sensitizable layer against the gauze. The complex is made to adhere to said gauze from the inner side of the frame, by wetting it with a solvent. When the layer in the complex is not photo-sensitive, said solvent may contain a sensitizing agent.

After drying, the supporting film is removed, the daylight exposure is performed directly according to the conventional method, through a positive ruled screen, the washing is carried out from the inside of the screen, also in a conventional way, to dissolve those portions of the photo-sensitive layer which have not been exposed to daylight, a further drying operation takes place, and, lastly, the transparent film is removed by dissolving same by means of a selective solvent, which solvent does not attack the portions of the emulsion which have been exposed to daylight, and remain adherent to the gauze.

The invention will now be explained in further detail, with reference to the appended diagrammatic drawing, wherein the three layers which constitute the complex film of the invention are purposely very much enlarged to make the explanations clearer. In said drawing.

Figure 1:
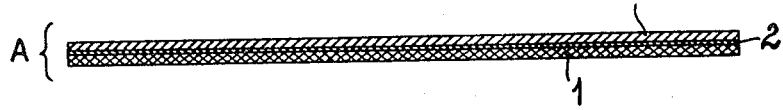
FIG. 1 is a sectional view of said complex film as supplied to the operator.

In the drawing, A designates the entire complex film of the invention in the condition in which it is supplied to the operator. Said complex comprises a backing layer or temporary supporting film 1, on which a very thin transparent film 2 is applied very accurately by any suitable means, said transparent film being subsequently coated with a photo-sensitive or photo-sensitizable emulsion layer 3.

Figure 2:
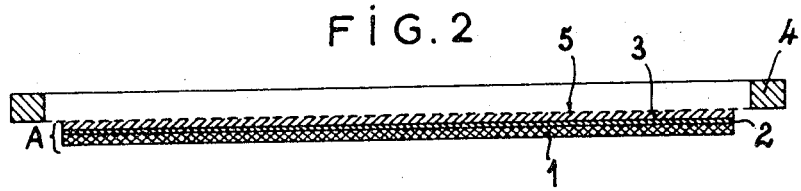
FIGS. 2 to 5 show the sequential steps in the processing of said complex film with the aim of obtaining a frame stencil.

The operator lays said complex A against a frame 4 provided with a perforated support or gauze 5, with the layer 3 against the back of said gauze 5, and he makes said complex adhere intimately to said gauze, by wetting from the inner side of said frame, with a solvent for the layer 3. As a result, said layer 3 becomes pasty, so that it adheres to the gauze 5 by coating the threads forming said gauze, as shown in FIG. 2.

In the event of the layer 3 in the complex film is only photo-sensitizable, said solvent may contain a sensitizing agent.

Said solvent is permitted to evaporate, and then the temporary supporting film 1 is removed, for instance, by being torn off.

Figure 3:
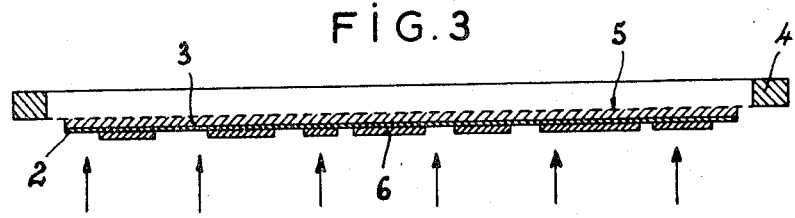
Figure 4:
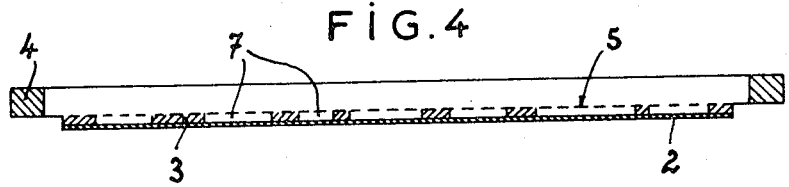
Figure 5:
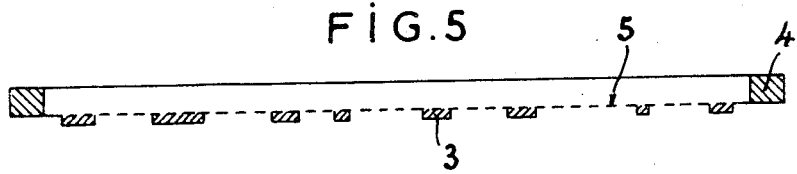

The remaining assembly is then applied on a positive ruled screen 6, as shown on FIG. 3, after which the assembly is exposed to daylight in the direction of the arrows of said figure.

A wasting operation is then performed in the usual way, from the inside of the frame, to dissolve, and thus remove, the portions 7 of the emulsion which have not been exposed to daylight.

After a further drying operation, the transparent film 2 is removed, by dissolving it with a suitable solvent adapted not to attack the portions of the emulsion which have been exposed to daylight.

Satisfactory results have been obtained with the use of a film complex, the composition and subsequent processing of which are as follows:

Composition of the complex film

Supporting film 1: Ethyl terephthalate, $50\mu$ thick
Transparent film 2: Nitrocellulose, $6\mu$ thick
Photo-sensitizable layer 3: Colored red, water soluble poly(vinyl) alcohol, $25\mu$ thick Solvents used for treating the above mentioned complex Solvent for the layer 3: Water, 90%; ammonium dichromate (sensitizing agent), 10%
Solvent for the film 2: Ethylglycol acetate
Stripping solvent: Lukewarm water The above is merely a description of a preferred embodiment of the present invention. Therefore, it should be understood that, within the scope of the appended claims, the invention may be practiced otherwise than as specifically described.

What we claim is:

1. A method for producing silk screen stencils, said method comprising providing a backing layer, a dichromate sensitized water soluble emulsion layer and a transparent polymeric film-forming layer in superposed relationship with said transparent layer interposed between said backing layer and said emulsion layer, said transparent layer being relatively thin and having a thickness substantially less than that of the backing layer and the emulsion layer, said backing layer being easily separable by peeling from said transparent layer, joining a gauze layer to a free surface of said emulsion layer, supplying a solvent to said gauze layer to interconnect said gauze layer and said emulsion layer, removing said backing layer from said transparent layer, covering partially said transparent layer and thereby said emulsion layer, exposing the uncovered portions of said transparent layer and emulsion layer to light, and washing said emulsion layer with water to dissolve only the covered portions thereof.

2. A method as claimed in claim 1 wherein said transparent layer is removed by washing with an organic solvent.

3. A method, as claimed in claim 1, wherein said backing layer is ethyl terephthalate, said transparent layer is nitrocellulose, and said emulsion layer is water soluble poly(vinyl) alcohol.

4. A method as claimed in claim 1, wherein said emulsion layer has an index of refraction and said transparent layer has an index of refraction equal to said index of refraction of said emulsion layer.

5. A method as claimed in claim 1, wherein said transparent layer has a thickness ranging from 2 to $10\mu$.

References Cited

UNITED STATES PATENTS

| | | | |
|---|---|---|---|
| 2,110,319 | 3/1938 | Bell et al. | 41—38.6 |
| 2,366,083 | 12/1944 | Box et al. | 101—128.3 |
| 2,943,936 | 7/1960 | Spechler | 96—75 |

NORMAN G. TORCHIN, Primary Examiner

W. H. LOUIE, Jr., Assistant Examiner

U.S. Cl. X.R.

96—75; 101—128.3